(12) United States Patent
Vanderhulst et al.

(10) Patent No.: US 9,832,648 B2
(45) Date of Patent: Nov. 28, 2017

(54) ACCESS CONTROL OF GEO-FENCED SERVICES USING CO-LOCATED WITNESSES

(71) Applicants: Geert Vanderhulst, Aarschot (BE); Marc Van Den Broeck, Sint-Katelijne-Waver (BE); Mohamed Ali Feki, Forest (BE); Fahim Kawsar, Antwerp (BE)

(72) Inventors: Geert Vanderhulst, Aarschot (BE); Marc Van Den Broeck, Sint-Katelijne-Waver (BE); Mohamed Ali Feki, Forest (BE); Fahim Kawsar, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 45 days.

(21) Appl. No.: 14/204,071

(22) Filed: Mar. 11, 2014

(65) Prior Publication Data
US 2015/0264564 A1 Sep. 17, 2015

(51) Int. Cl.
*H04L 12/06* (2006.01)
*H04L 12/08* (2006.01)
(Continued)

(52) U.S. Cl.
CPC ........... *H04W 12/08* (2013.01); *H04W 4/021* (2013.01); *H04W 4/023* (2013.01); *H04L 63/107* (2013.01);
(Continued)

(58) Field of Classification Search
CPC ........ H04L 63/107; H04L 63/12; H04W 4/02; H04W 12/08; H04W 12/12; H04W 12/06;
(Continued)

(56) References Cited

U.S. PATENT DOCUMENTS 7,024,552 B1 * 4/2006 Caswell et al. ............... 713/155
7,669,759 B1 * 3/2010 Zettner ......................... 235/380
(Continued)

FOREIGN PATENT DOCUMENTS

EP 2 265 046 A1 12/2010

OTHER PUBLICATIONS

Ferg, B., et al., "OpenID Authentication 2.0—Final," *OpenID*, Dec. 5, 2007, retrieved from http://openid.net/specs/openid-authentication-2_0.html, pp. 1-36.
(Continued)

*Primary Examiner* — Catherine Thiaw
(74) *Attorney, Agent, or Firm* — Tong, Rea, Bentley & Kim, LLC (57) ABSTRACT

A capability for providing access control for a geo-fenced service (GFS) is presented herein. In general, a GFS is a network-hosted service having associated therewith a spatial region within which the network-hosted service may be accessed. The spatial region of the GFS may be defined based on one or more witnesses co-located at a location of the spatial region within which the GFS may be accessed, which are associated with the GFS in order to support access control for the GFS. The capability for providing access control for the GFS, based on a request by a user device to access the GFS, uses one or more co-located witnesses associated with the GFS to verify the presence of the user device within the spatial region within which the GFS may be accessed before granting access by the user device to the GFS.

19 Claims, 3 Drawing Sheets

(51) Int. Cl.
| | |
|---|---|
| *H04W 12/08* | (2009.01) |
| *H04W 4/02* | (2009.01) |
| H04L 29/06 | (2006.01) |
| H04W 4/00 | (2009.01) |
| H04W 12/10 | (2009.01) |

(52) U.S. Cl.
CPC ............ *H04L 63/12* (2013.01); *H04W 4/008* (2013.01); *H04W 12/10* (2013.01)

(58) Field of Classification Search
CPC ..... H04W 4/021; H04W 4/023; H04W 12/10; H04W 4/008; G06F 2221/2111
See application file for complete search history.

(56) References Cited

U.S. PATENT DOCUMENTS

| | | | | |
|---|---|---|---|---|
| 8,949,958 | B1* | 2/2015 | Dixon ............................. | 726/6 |
| 2005/0094610 | A1* | 5/2005 | de Clerq ................ | G05B 15/02 370/338 |
| 2009/0275348 | A1* | 11/2009 | Weinreich ............ | G01S 5/0036 455/456.3 |
| 2010/0240398 | A1* | 9/2010 | Hotes ................... | H04L 63/102 455/456.2 |
| 2011/0087887 | A1* | 4/2011 | Luft et al. ..................... | 713/178 |
| 2011/0320119 | A1* | 12/2011 | Jerez Morales et al. ..... | 701/207 |
| 2012/0106738 | A1* | 5/2012 | Belenkiy et al. ............ | 380/270 |
| 2013/0045758 | A1 | 2/2013 | Khorashadi et al. | |
| 2013/0115872 | A1* | 5/2013 | Huang et al. ................ | 455/3.01 |
| 2013/0173467 | A1 | 7/2013 | Nuzzi et al. | |
| 2013/0311371 | A1* | 11/2013 | Zhu ........................ | H04L 41/12 705/44 |
| 2014/0068778 | A1* | 3/2014 | Bhatia et al. ................... | 726/26 |
| 2014/0108780 | A1* | 4/2014 | Jin ........................ | H04B 11/00 713/150 |
| 2014/0162693 | A1* | 6/2014 | Wachter et al. ........... | 455/456.3 |
| 2014/0164124 | A1* | 6/2014 | Rhoads ..................... | 705/14.58 |
| 2014/0189804 | A1* | 7/2014 | Lehmann et al. ................ | 726/4 |
| 2014/0228045 | A1* | 8/2014 | Belmonte et al. ......... | 455/456.1 |
| 2014/0253390 | A1* | 9/2014 | Alpert ...................... | G01S 5/02 342/464 |
| 2015/0004935 | A1* | 1/2015 | Fu ................................ | 455/411 |
| 2015/0121464 | A1* | 4/2015 | Hughes, Jr. ........... | H04L 63/105 726/4 |
| 2015/0156744 | A1* | 6/2015 | Haro ..................... | H04W 4/021 455/456.1 |

OTHER PUBLICATIONS

Hardt, D., "The OAuth 2.0 Authorization Framework," *Internet Engineering Task Force*, RFC 6749, Oct. 2012, pp. 1-152.
Apple, "iOS: Understanding iBeacon," *Apple*, retrieved from http://support.apple.com/kb/HT6048 on Mar. 12, 2014.
Kontakt.io, webpage, retrieved from http://kontakt.io/ on Mar. 12, 2014.
Bareth, U., "Privacy-Aware and Energy-Efficient Geofencing Through Reverse Cellular Positioning," *8th International Wireless Communications and Mobile Computing Conference (IWCMC)* 2012, Aug. 27-31, 2012, pp. 153-158.
Sastry, N., et al., "Secure Verification of Location Claims," *WiSE '03*, Sep. 19, 2003, ACM, San Diego, California.
Luo, W., et al., "VeriPlace: A Privacy-Aware Location Proof Architecture," *ACM GIS '10*, Nov. 2-5, 2010, San Jose, California, pp. 23-32.
Zhu, Z., et al., "APPLAUS: A Privacy-Preserving Location Proof Updating System for Location-based Services," *Proceedings of INFOCOM '11*, Apr. 10-15, 2011.
International Search Report and Written Opinion of Application PCT/IB2015/000344, dated Aug. 27, 2015, 13 pages.
Canlar, et al., "CREPUSCOLO: a Collusion Resistant Privacy Preserving Location Verification System," 2013 International Conference on Risks and Security of Internet and Systems (CRISIS), IEEE Oct. 23, 2013, pp. 109.
Singlee, et al., "Location Verification Using Secure Distance Bounding Protocols," Mobile ADHOC and Sensor Systems Conference, 2005, IEEE International Conference, Nov. 7, 2005, pp. 834-840.
Vanderhulst, et al., "Exploring the Design Space for Geo-Fenced Connected Devices and Services at Home," Pervasive and Ubiquitous Computing, ACM, New York, Sep. 13, 2014, pp. 1321-1327.
Hasan, et al., "Where Have You Been? Secure Location Provenance for Mobile Devices," Jul. 9, 2011, retrieved by WIPO on Aug. 20, 2015 from the internet: URL:http://arxiv.org/abs/1107.1821, pp. 1-14.
Wang, et al. "STAMP: Ad Hoc Spatial-Temporal Provenance Assurance for Mobile Users," 2013 21st IEEE International Conference on Network Protocols (ICNP) IEEE, Oct. 7, 2013, pp. 1-10.

\* cited by examiner

ACCESS CONTROL OF GEO-FENCED SERVICES USING CO-LOCATED WITNESSES

TECHNICAL FIELD

The disclosure relates generally to network-hosted services and, more specifically but not exclusively, to security for network-hosted services.

BACKGROUND

As the use of smart objects continues to grow, the various ways in which users may access and interact with smart objects also continues to grow. With the advent of cloud computing, many services that support access to and control of smart objects have been moved to the cloud, such that access to and control of smart objects is no longer constrained to physical places as it was in the past. This is especially true given the advances in the capabilities of mobile devices, such as smart phones and tablet computers, which may be used to access services that support access to and control of smart objects. For example, a user may use his or her smartphone to access a service, running in the cloud, that supports access to and control of a home security system, even when the user is not at home. As a result, the implicit protection of a local network that limits access to the environment in which the smart object is located (e.g., a home network) is no longer valid, as users may now access the smart object from virtually anywhere. Additionally, this situation is exacerbated by the rollout of simpler smart objects, removal of tangible interaction properties, and so forth. Indeed, rather than depending on physical controls, many smart objects are nowadays being accessed and used via applications running on mobile devices. While this ubiquitous access to smart objects is highly convenient, it also is making smart objects, and their associated data, more vulnerable. Accordingly, there is a need for improved security associated with access to and control of smart objects and network-hosted services which may be used to control smart objects.

SUMMARY OF EMBODIMENTS

Various deficiencies in the prior art are addressed by embodiments for supporting access control for a geo-fenced service.

In at least some embodiments, an apparatus includes a processor and a memory communicatively connected to the processor. The processor is configured to receive a request by a user device to access a network-hosted service, where the network-hosted service has associated therewith a witness device and a spatial region to which access to the network-hosted service is confined. The processor is configured to propagate, toward the user device, a message configured to trigger the user device to initiate a local wireless broadcast. The processor is configured to determine, based on location verification information received from the witness device, whether the user device is authorized to access the network-hosted service. In at least some embodiments, these functions may be provided as a method by using a processor and a memory to provide the described functions. In at least some embodiments, a computer-readable storage medium stores instructions which, when executed by a computer, cause the computer to perform a method configured to provide the described functions.

In at least some embodiments, an apparatus includes a processor and a memory communicatively connected to the processor. The processor is configured to propagate a request to access a network-hosted service, where the network-hosted service has associated therewith a witness device and a spatial region to which access to the network-hosted service is confined. The processor is configured to perform a local wireless broadcast based on receipt of a message associated with the request to access the network-hosted service. The processor is configured to receive an indication as to whether the apparatus is authorized to access the network-hosted service. In at least some embodiments, these functions may be provided as a method by using a processor and a memory to provide the described functions. In at least some embodiments, a computer-readable storage medium stores instructions which, when executed by a computer, cause the computer to perform a method configured to provide the described functions.

In at least some embodiments, an apparatus includes a processor and a memory communicatively connected to the processor. The processor is configured to receive a local wireless broadcast from a user device requesting to access a network-hosted service, where the network-hosted service has associated therewith a spatial region to which access to the network-hosted service is confined. The processor is configured to determine location verification information based on the local wireless broadcast from the user device, where the location verification information is indicative of a location of the user device relative to the spatial region of the network-hosted service. The processor is configured to propagate the location verification information toward the network-hosted service or a device associated with the network-hosted service. In at least some embodiments, these functions may be provided as a method by using a processor and a memory to provide the described functions. In at least some embodiments, a computer-readable storage medium stores instructions which, when executed by a computer, cause the computer to perform a method configured to provide the described functions.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A capability for providing access control for a geo-fenced service (GFS) is presented herein. In general, a GFS is a network-hosted service having associated therewith a spatial region within which the network-hosted service may be accessed (e.g., within which a user device requesting access to the GFS must be located in order to be granted access to the GFS). The spatial region of the GFS is associated with a location (e.g., a room, a building, a group of buildings, an outdoor area, or the like) may be defined based on one or more witness devices deployed at the location associated with the spatial region of the GFS (referred to herein as co-located witnesses). The capability for providing access control for the GFS uses the one or more witness devices associated with the GFS to provide access control for the GFS. The capability for providing access control for the GFS, responsive to a request by a user device to access the GFS, uses one or more witness devices associated with the GFS to verify the presence of the user device within the spatial region of the GFS before granting access by the user device to the GFS. In at least some embodiments, use of a witness device associated with a GFS to provide access control for the GFS may include receiving a request by a user device to access the GFS, propagating toward the user device a message configured to trigger the user device to initiate a local wireless broadcast (and, optionally, propagating a message toward the witness device associated with the GFS), and determining authorization of the user device to access the GFS based on location verification information (e.g., an indication of a unique identifier broadcast by the user device in the local wireless broadcast, information indicative of or which may be processed to triangulate a location of the user device relative to the spatial region defined for the GFS, or the like, as well as various combinations thereof) received from the witness device associated with the GFS. These and various other embodiments of the capability for providing access control for a GFS may be better understood by way of reference to an exemplary system supporting access control for a GFS, as depicted in FIG. 1.

Figure 1:
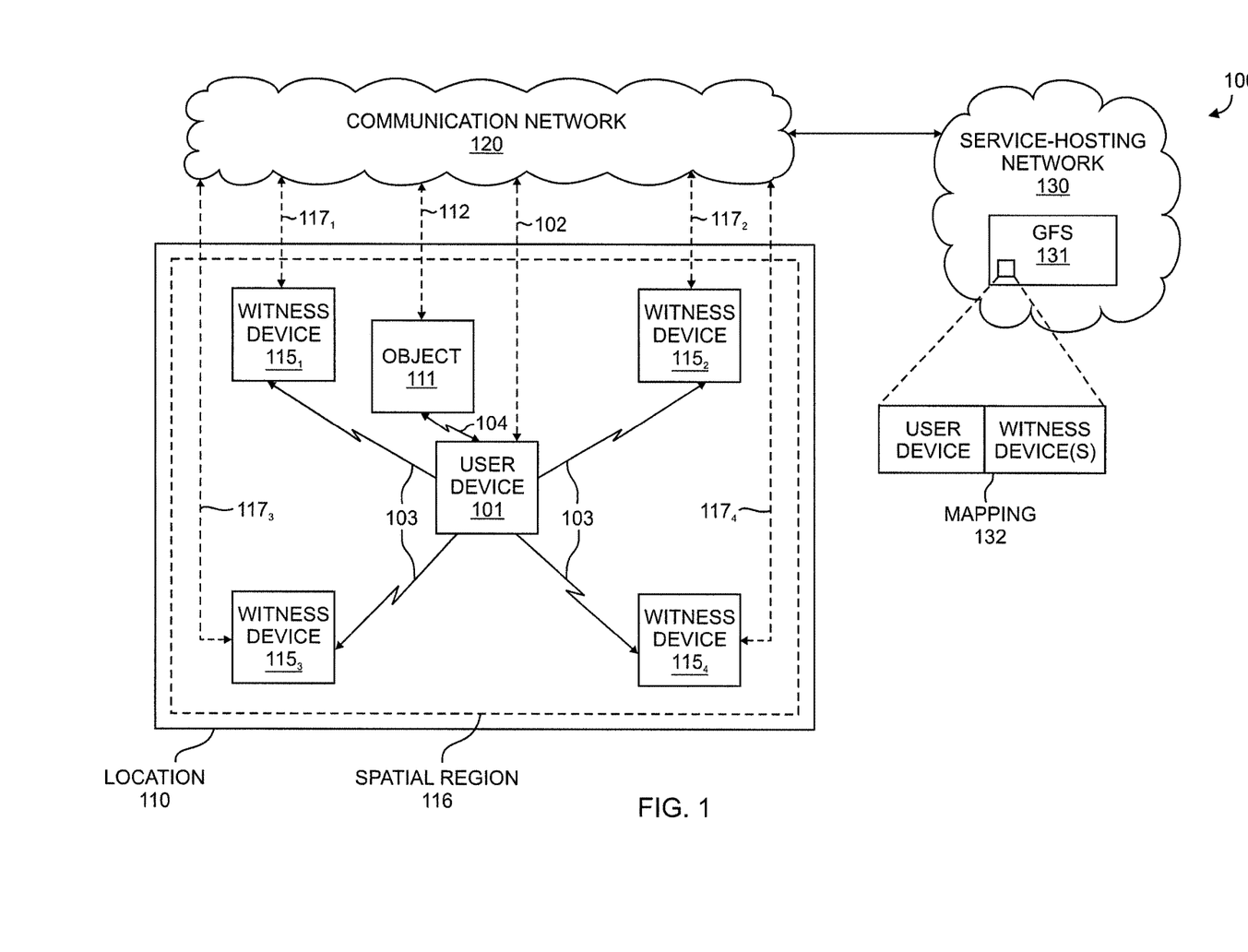
FIG. 1 depicts an exemplary system configured to provide access control for a GFS.

FIG. 1 depicts an exemplary system configured to provide access control for a GFS. The system 100 includes a location 110, a communication network 120, and a service-hosting network 130. As depicted in FIG. 1, an object 111 at location 110 has associated therewith a GFS 131 that is hosted on service-hosting network 130, where the GFS 131 may be used to access and control the object 111. As further depicted in FIG. 1, a user at location 110 would like to access the GFS 131, using a user device 101, in order to access and control the object 111 via the GFS 131. The GFS 131 is secured by verifying the location of the user device 101 based on a set of witness devices $115_1$-$115_4$ (collectively, witness devices 115) deployed at location 110. The witness devices 115 are used to limit access to GFS 131 to a spatial region 116 within which GFS 131 may be accessed by user device 101. The GFS 131 uses the witness devices 115 to verify the presence of the user device 101 within the spatial region 116 of the GFS 131 before granting the user device 101 access to the GFS 131. The GFS 131 is configured to perform location verification of the user device 101 using the witness devices 115 as discussed in additional detail below. In this manner, GFS 131 may be secured against various scenarios in which the security of GFS 131 and, thus, the security of object 111, might otherwise be compromised. For example, various embodiments depicted and described herein may protect against an attack in which a malicious user of a user device learns of the presence of the object 111 at the location 110 and attempts to access and control the object 111 remotely via the GFS 131 when the user should not be authorized to access and control the object 111 (e.g., the malicious user device provides GPS coordinates that correspond to the location 110 of the object 111 when the user device is not actually at the location 110 of the object 111). Similarly, for example, various embodiments depicted and described herein may protect against an attack in which a malicious user of a user device learns of the presence of the object 111 at the location 110, proceeds to a position near the location 110 (but outside of the spatial region 116), and attempts to access and control the object 111 via the GFS 131 when the user should not be authorized to access and control the object 111. It will be appreciated that various embodiments depicted and described herein may protect against other potential types of attacks or other forms of unauthorized access to the GFS even where such unauthorized access may not be malicious. These and various other embodiments may be better understood by further considering various elements of system 100 that have been introduced above.

The user device 101 may be any type of user device which may be used to access and control a network-hosted service such as GFS 131. The user device 101 may include one or more processors, one or more memories, one or more storage modules, one or more communications modules, one or more interaction interfaces, or the like, as well as various combinations thereof. The user device 101 includes a processor configured to perform various functions depicted and described herein as being performed by user device 101. The user device 101 includes at least one communication module configured for communication beyond location 110 (e.g., via cellular wireless access, WiFi access, or the like), such that user device 101 may communicate with GFS 131 on service-hosting network 130 (illustratively, using a communication path 102 between user device 101 and communication network 120). The user device 101 also includes at least one communication module configured for performing local wireless broadcasts by user device 101 at location 110 (e.g., using Bluetooth, ZigBee, wireless Universal Serial Bus (USB), or any other suitable capability for local wireless broadcasts by user device 101 at location 110), such that user device 101 may wirelessly broadcast to witness devices 115 at location 110 at which the spatial region 116 for GFS 131 is defined (illustratively, local wireless broadcasts 103 between user device 101 and the witness devices 115, respectively) and, optionally, also may communicate with object 111 for accessing and controlling object 111 (illustratively, local wireless communication path 104). The user device 101 may include an interaction interface via which the user may request access to GFS 131, interact with GFS 131 after access to GFS 131 is granted, interact with object 111 (e.g., for controlling object 111) via use of GFS 131, or the like, as well as various combinations thereof (e.g., one or more display screens, one or more sets of buttons or touch screen capabilities, or the like, as well as various combinations thereof). For example, user device 101 may be a laptop computer, a tablet computer, a smartphone, or the like.

The location 110 may include any suitable location with which GFS 131 may be associated, which may be of any suitable size. For example, location 110 may be a portion of a building (e.g., a portion of a room, a room, a subset of rooms of a floor, a floor, a group of floors, or the like), a building, a group of buildings, an outdoor location (e.g., a portion of a street, a park, a portion of a park, or the like), or the like, as well as various combinations thereof. For example, location 110 may be a home, a portion of a home, a building housing one or more businesses or organizations, a portion of a building housing one or more businesses or organizations, a restaurant, a portion of a restaurant, a stadium, a portion of a stadium, a museum, a portion of a museum, an airport, a portion of an airport, or any other suitable type of location or locations with which GFS 131 may be associated.

The object 111 may include any suitable type of object with which GFS 131 may be associated. For example, object 111 may be a smart object which may be controlled via GFS 131 which is running in service-hosting network 130. The object 111 may include a processor, a memory, one or more communication modules, or the like, as well as various combinations thereof. The object 111 may be configured to interact with GFS 131 running in service-hosting network 130 via a communication path 112 between object 111 and communication network 120, where the communication path 112 may include any suitable type of network access connection for a connected object (e.g., WiFi-based, cable-based, cellular-based, or the like, as well as various combinations thereof). The object 111 also may be configured to support local interactions with object 111 via a local communication path (e.g., interactions by user device 101 with object 111 via the local wireless communication path 104, or any other local interactions which may be supported using any other local communication paths (which have been omitted for purposes of clarity)). For example, object 111 may be a security camera, a smart lock, a WiFi access point, an entertainment device (e.g., set-top box, television, surround sound system, computer, or the like), a connected appliance (e.g., refrigerator, curtains, or the like), or any other type of object for which access and control to the object may be supported using a network-hosted service such as GFS 131. It will be appreciated that, although primarily depicted and described herein within with respect to embodiments in which GFS 131 is associated with a physical object (illustratively, object 111), in at least some embodiments, discussed in additional detail below, the GFS 131 may not be associated with any physical object.

The witness devices 115 may include any suitable devices which may be used to verify the presence of the user device 101 within the spatial region 116 of the GFS 131 before the user device 101 is granted access to the GFS 131. In general, a witness device 115 may include one or more processors, one or more memories, one or more storage modules, one or more communications modules, or the like, as well as various combinations thereof. A witness device 115 may include a processor configured to perform various functions depicted and described herein as being performed by witness devices 115. A witness device 115 includes a communication module configured for communication beyond location 110 (e.g., via cellular wireless access, WiFi access, wireline access, or the like), such that the witness device 115 may communicate with GFS 131 on service-hosting network 130 (illustratively, communication paths $117_1$-$117_4$ between witness devices $115_1$-$115_4$ and communication network 120, respectively) for enabling GFS 131 to determine authorization of user device 101 to access GFS 131 based on location verification information received from witness devices 115. A witness device 115 also includes a communication module configured for receiving local wireless broadcasts by user device 101 at location 110 (e.g., broadcasts using Bluetooth, ZigBee, wireless USB, or any other suitable capability for local wireless broadcasts by user device 101 at location 110), such that the witness device 115 may obtain information for use in verifying the presence of the user device 101 within spatial region 116 of GFS 131 before access by the user device 101 to GFS 131 is granted. For example, the witness devices 115 may include smart objects (e.g., which may or may not have associated GFSs associated therewith), sensors, or the like, as well as various combinations thereof.

The spatial region 116 defines an area within which user device 101 (or a delegate of user device 101, as discussed further below) must be located in order for user device 101 to be granted access to GFS 131. The spatial region 116 may be defined based on the witness devices 115. The spatial region 116 may be defined based on witness devices 115 in any suitable manner. For example, the spatial region 116 may be defined such that user device 101 is required to be within wireless range of a threshold number of the witness devices 115 (e.g., anywhere from one to all of the witness devices 115). For example, the spatial region 116 may be defined such that user device 101 is required to be within a particular distance or distances from one or more of the witness device 115 (which also may be a requirement that the user device is required to be at a particular location that is within the spatial region of the GFS) in order to be granted access to GFS 131. Here, the distances may be defined in various ways so as to give the spatial region 116 a particular shape or set of shapes (e.g., one or more circles where one or more witness devices 115 are located at the center(s) of the circle(s), an ellipse where two witness devices 115 are located at the focal points of the ellipse, a triangle where three witness devices 115 are located at the three corners of the triangle or at points inside the defined triangle, a quadrilateral where four witness devices 115 are located at the four corners of the quadrilateral or at points inside the defined quadrilateral, or the like). In at least some embodiments, the various distances associated with the boundaries of a shape or shapes of the spatial region 116 defined by the witness devices 115 may be determined based on one or more of signal strength information (e.g., where witness devices 115 measure the signal strength of signals received from user device 101 for use in triangulating the position of the user device 115 relative to the witness devices 115 defining the spatial region 116), time-of-flight measurement information from one or more time-of-flight cameras, or the like, as well as various combinations thereof. It will be appreciated that, although primarily depicted in FIG. 1 with respect to spatial region 116 which has a particular shape defined based on a particular number of witness devices 115 (illustratively, a quadrilateral shape defined by four witness devices 115 where the four witness devices 115 are internal to the quadrilateral shape), spatial region 116 may be defined to cover any other suitable type of area using any suitable number of witness devices.

The communication network 120 may include any communication networks configured to facilitate communications between GFS 131 of service-hosting network 130 and devices located at location 110 (e.g., user device 101, object 101, witness devices 115, or the like). For example, communication network 120 may include one or more wireless access networks (e.g., cellular or WiFi access for user device 101, cellular or WiFi access for object 101, cellular or WiFi access for witness devices 115, or the like), one or more wireline access networks (e.g., where the user device 101 may be connected to a wireline network at location 110, where object 111 may be connected to a wireline network at location 110, where at least some of the witness devices 115 may be connected to a wireline network at location 110), one or more core wireless networks, one or more core wireline networks, one or more public data networks, or the like, as well as various combinations thereof.

The service-hosting network 130 may be any network configured to host a service. For example, the service-hosting network 130 may be a datacenter network comprising servers running virtual machines (VMs) which may be used to provide GFS 131. For example, the service-hosting network 130 may be communication service provider network having a dedicated server running GFS 131 or using a virtualization solution to run GFS 131. The service-hosting network 130 may include any other type of network suitable for hosting GFS 131.

The GFS 131 is a network-hosted service, the use of which is confined to a particular spatial region (illustratively, spatial region 116 at location 110). The GFS 131 is associated with object 111 at the location 110. The types of network-hosted services that may be used within various environments (e.g., home, business, public, or the like) will be understood by one skilled in the art. For example, where location 110 is a home, GFS 131 may be a service for access to security cameras at the home, a service for controlling smart locks at the home (e.g., for locking or unlocking doors), a service for controlling a home entertainment system at the home (e.g., for changing television channels, increasing or decreasing volume, or the like), a service for energy monitoring at the home, a service for WiFi access point (AP) configuration for a WiFi AP at the home, a service for controlling one or more connected appliances (e.g., lights, refrigerator, curtains, or the like) at the home, or the like, as well as various combinations thereof. For example, where location 110 is a business location, GFS 131 may be a service for a service for access to security cameras at the business location, a service for controlling smart locks at the business location, a service for one or more connected appliances (e.g., lights, copy machine, or the like) at the business location, or the like, as well as various combinations thereof. It will be appreciated that, while the foregoing examples describe services that are associated with physical objects at the location 110 at which the service may be used (e.g., cameras, lights, and so forth), GFS 131 also may be a service that is not necessarily associated with any physical objects at the location 110 at which GFS 131 may be used. In at least some embodiment, for example, GFS 131 may be independent of any physical objects at the location 110, and access to GFS 131 still may be confined to the spatial region 116 defined for GFS 131. For example, GFS 131 may be services such as Internet access (e.g., for limiting Internet access for a child to an area where the child will be monitored by an adult), a social media application, online gaming, or the like. The GFS 131 may be implemented in any suitable manner (e.g., as an application, where the application server is hosted in service-hosting network 130 and the user device 101 has an associated application client configured to enable access to and use of GFS 131).

The GFS 131 is configured to control access to GFS 131 by user device 101 based on the use of witness devices 115 to verify the presence of user device 101 within the spatial region 116 defined for GFS 131 before granting the user device 101 access to GFS 131. As depicted in FIG. 1, GFS 131 maintains a mapping 132 between the user device 101 (e.g., an identifier of user device 101) and a list of the witness devices 115 which may be used by GFS 131 to verify the presence of user device 101 within the spatial region 116 defined for access by the user device 101 to GFS 131. The GFS 131 also maintains (e.g., as part of mapping 132 or associated with mapping 132) or otherwise has access to address information (for each of the witness devices 115 associated with the spatial region 116 for use by GFS 131 to communicate with the witness devices 115 associated with the spatial region 116) and a definition of the spatial region 116 within which user device 101 must be located in order to access GFS 131. The definition of the spatial region 116 of the mapping 132 may include information which may be used by GFS 131 to determine whether user device 101 is located within the spatial region 116 responsive to a request by the user device 101 to access GFS 131 (e.g., various rules according to which the area covered by spatial region 116 is defined, such as in terms of presence or absence of signals, distance-indicative or position-indicative information (e.g., based on signal strength measurements, time-of-flight measurements, or the like), or the like, as well as various combinations thereof). Here, it will be appreciated that the definition of the spatial region 116 is mapped to user device 101 since, although primarily depicted and described herein for purposes of clarity with respect to GFS 131 being intended for use by a single user device (namely, user device 101), the GFS 131 may be a network-hosted service which may be accessible to any suitable number of user devices (e.g., different user devices may access different instances of GFS 131 which may be personalized for those different user devices), in which case each user device may have associated therewith one or more spatial regions within which the respective user device may access GFS 131. However, it will be appreciated that, where GFS 131 is only accessible to user device 101 or where GFS 131 represents an particular instance of a network-hosted service that is only accessible to user device 101, GFS 131 may only need to maintain the definition of the spatial region 116 without mapping the definition of the spatial region 116 to the user device 101.

The GFS 131 is configured to control access to GFS 131 by user device 101 based on the use of witness devices 115 to verify the presence of user device 101 within the spatial region 116 defined for GFS 131 before granting the user device 101 access to GFS 131. The GFS 131, responsive to a request by the user device 101 to access GFS 131, may propagate toward the user device 101 a message configured to trigger user device 101 to perform a local wireless broadcast at location 110 (and, optionally, also may propagate a message toward the witness devices 115 associated with the spatial region 116 for GFS 131), receive location verification information from the witness devices 115 based on the local wireless broadcast by user device 101 at location 110, determine authorization of the user device 101 to access GFS 101 based on the location verification information from the witness devices 115, and propagate toward the user device 101 an indication as to whether or not the user device 101 is being granted access to the GFS 131. These and various other embodiments by which GFS 131 may control access by user device 101 to GFS 131 based on the use of witness devices 115 to verify the presence of user device 101 within the spatial region 116 defined for GFS 131 may be better understood by way of reference to the exemplary process depicted in FIG. 2.

Figure 2:
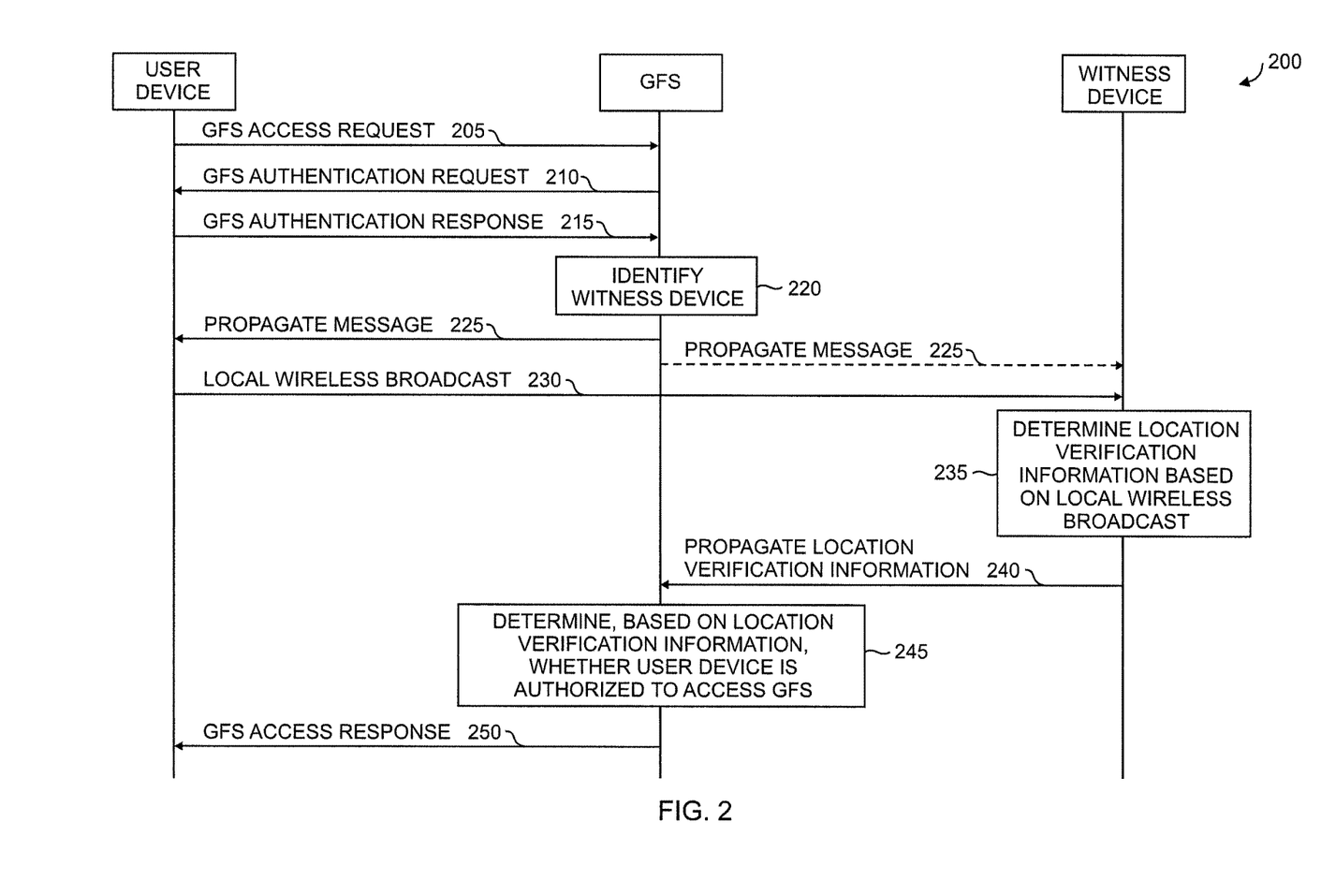
FIG. 2 depicts an exemplary embodiment of a method for controlling access by a user device to a GFS using a witness device.

FIG. 2 depicts an exemplary embodiment of a method for controlling access by a user device to a GFS using a witness device. As depicted in FIG. 2, method 200 involves communication exchanges between the user device, the GFS, and the witness device. The communication between the GFS and the user device may be via any suitable communication path via which a user device may communicate with a network-hosted service in a service-hosting network. The communication between the GFS and the user device may be via any suitable communication path via which a witness device may communicate with a network-hosted service in a service-hosting network. The communication from the user device to the witness device may be via any suitable local wireless broadcast capability. It will be appreciated that, while primarily depicted and described as being performed serial, at least a portion of the steps of method 200 may be performed contemporaneously or in a different order than depicted in FIG. 2.

At step 205, the user device propagates a GFS access request message to the GFS. The GFS is a network-hosted service that is hosted within a service-hosting network. The GFS access request message indicates a request by the user device to access the GFS. The GFS access request message may include an indication of the GFS to which access is requested, an identifier of the user device or user using the user device, or the like, as well as various combinations thereof. The GFS access request message may be sent by the user device automatically (e.g., responsive to detecting the presence of an object with which the GFS is associated), responsive to detection of a request by a user of the user device, or the like. The GFS is a network-hosted service and, thus, the GFS access request message sent by the user device may be sent via any suitable communication path (e.g., via a cellular access network, via a WiFi access network, or the like).

At step 210, the GFS sends an authentication request message to the user device. The authentication request message requests that the user device provide authentication information which may be used by the GFS to verify the identity of the user device.

At step 215, the user device sends an authentication response message to the GFS. The authentication response message includes authentication information which may be used by the GFS to verify the identity of the user device. Here, for purposes of clarity, it is assumed that the GFS successfully authenticates the user device based on the authentication response message received from the user device. It will be appreciated that, where the GFS is unable to successfully authenticate the user device, the user device may be denied access to the GFS before location verification is initiated.

At step 220, the GFS identifies the witness device associated with the GFS. In the case in which the GFS is dedicated for use by the user device, the witness device may simply be associated with the GFS. In the case in which the GFS is an instance of a GFS, where the GFS instance to which the user device is requesting access is associated with the user device, the witness device may be associated with the user device (e.g., a user device identifier may be used to access a mapping identifying the witness device that is associated with the GFS instance to which the user device is requesting access.

At step 225, the GFS propagates a message toward the user device and, optionally, also propagates a message toward the witness device. The message propagated toward the user device is configured to trigger the user device to initiate a local wireless broadcast. The message propagated toward the user device may or may not include information to be broadcast by the user device. The message propagated toward the witness device may be configured to inform the witness device to expect or to listen for a local wireless broadcast (or, more specifically, to expect or to listen for the local wireless broadcast by the user device). The message propagated toward the witness device may or may not include an indication of information to be broadcast by the user device.

At step 230, the user device initiates the local wireless broadcast. The local wireless broadcast, as discussed further below, may include information received from the GFS in the message propagated from the GFS to the user device, information selected by the user device for broadcasting, or the like. Here, for purposes of clarity, it is assumed that the witness device receives the local wireless broadcast by the user device, because the user device is located within local wireless range of the witness device. It will be appreciated that, where the user device is not within local wireless range of the witness device, the witness device will not receive the local wireless broadcast of the user device and, thus, the presence of the user device within the spatial region of the GFS will not be verified and the user device will be denied access to the GFS.

At step 235, the witness device determines location verification information. The location verification information, as discussed in additional detail below, may depend on one or more of the manner in which the GFS is configured to determine authorization of the user device to access the GFS (e.g., whether verification of the location of the user device is performed by the witness device and provided to the GFS or whether verification of the location of the user device is performed by the GFS), the manner in which the spatial region of the GFS is defined (e.g., based on being within wireless range, based on triangulation of a position of the user device, or the like), or the like, as well as various combinations thereof. For example, as discussed in additional detail below, the location verification information may include an explicit indication that the location of the user device has been verified as being within the spatial region defined for the GFS, information which may be processed to determine whether the location of the user device is verified as being within the spatial region defined for the GFS, or the like. At step 240, the witness device propagates the location verification information toward the GFS.

At step 245, the GFS determines authorization of the user device to access the GFS based on the location verification information from the witness device. The GFS may determine, based on the location verification information, whether the location of the user device is verified as being at a location that is within the spatial region defined for the GFS. The location verification information may include an explicit indication that the location of the user device is verified as being at a location that is within the spatial region defined for the GFS, information which may be processed by the GFS for determining whether the location of the user device is verified as being at a location that is within the spatial region defined for the GFS, or the like. Here, for purposes of clarity, it is assumed that the location of the user device within the spatial region of the GFS is verified and, thus, that authorization of the user device to access the GFS also is verified.

As discussed herein, various embodiments for implementation of steps 225-245 of method 200 may depend on various factors.

In at least some embodiments, the message propagated from the GFS to the user device includes a unique identifier to be broadcast by the user device, the user device broadcasts the unique identifier via the local wireless broadcast, the witness device receives the unique identifier in the local wireless broadcast of the user device, the witness device propagates the unique identifier received from the user device in the local wireless broadcast to the GFS as (part of) the location verification information, and the GFS determines whether the location of the user device is verified based on a comparison of the unique identifier propagated to the user device to the unique identifier received from the witness device (e.g., if the unique identifiers match then the location of the user device is verified; otherwise, the location of the user device is not verified). The unique identifier may be any suitable value or information which may be used to support verification that the user device is located within the spatial region defined for the GFS. The unique identifier may be generated or otherwise obtained by the GFS. The unique identifier may be a random value (e.g., number, string, or the like) that is only expected to be used once within the context of verifying the location of the user device for this particular request to access the GFS. The unique identifier may be a value that does not include or encode any information associated with the user, so as to protect the privacy of the user. The witness device may or may not provide additional information (e.g., signal strength measurements, time-of-flight measurements, or the like) as part of the location verification information that is provided to the GFS. The GFS may or may not propagate a message to the witness device in order to inform the witness device to expect or to listen for the local wireless broadcast by the user device (e.g., such that, if the witness device does not receive a local wireless broadcast from the user device after a threshold length of time, the witness device may propagate to GFS location verification information indicative that the witness device did not receive a local wireless broadcast from the user device, which may be interpreted by the GFS as an indication that the user device is not within local wireless range of the witness device and, thus, that the user device is located outside of the spatial region of the GFS).

In at least some embodiments, the message propagated from the GFS to the user device includes a unique identifier to be broadcast by the user device and the GFS also propagates to the witness device a message that includes the same unique identifier, the user device broadcasts the unique identifier via the local wireless broadcast, the witness device receives the unique identifier in the local wireless broadcast of the user device, and the witness device determines whether the unique identifier received from the user device and the unique identifier received from the GFS match. In at least some embodiments, in which verification of the location of the user device is based on the unique identifier (but not on additional information associated with the local wireless broadcast by the user device), the determination as to whether the unique identifier received from the user device and the unique identifier received from the GFS match may be considered to be a determination by the witness device as to whether the location of the user device is verified (e.g., if the unique identifiers match then the location of the user device is verified; otherwise, the location of the user device is not verified), and the witness device propagates toward the GFS location verification information including an explicit indication as to whether the location of the user device has been verified. Here, the GFS may simply determine whether the location of the user device is verified based on the indication provided by the witness device in the location verification information. In at least some embodiments, in which verification of the location of the user device is based on the unique identifier as well as additional information associated with the local wireless broadcast by the user device (e.g., distance-indicative information which may be used to triangulate the position of the user device relative to the spatial region of the GFS, or the like), the determination as to whether the unique identifier received from the user device and the unique identifier received from the GFS match may be considered to be only part of the determination as to whether the location of the user device is verified, in which case either (1) witness device may process the additional information to determine whether the location of the user device is verified and then propagate, toward the GFS, location verification information including an explicit indication as to whether the location of the user device has been verified (such that the GFS may simply determine whether the location of the user device is verified based on the explicit indication provided by the witness device in the location verification information) or (2) witness device may propagate the result of the comparison of the unique identifiers as well as the additional information to the GFS as (part of) the location verification information and the GFS may process the location verification information to determine whether the location of the user device is verified. As discussed above, the unique identifier may be any suitable value (e.g., a random value that is only expected to be used once within the context of verifying the location of the user device for this particular request to access the GFS, a value that does not include or encode any information associated with the user, so as to protect the privacy of the user, or the like, as well as various combinations thereof). As discussed above, the additional information may include distance-indicative information (e.g., signal strength measurements, time-of-flight measurements, or the like) or other suitable types of information which may be processed to triangulate the position of the user device relative to the spatial region of the GFS, or the like. The various ways in which the witness device or the GFS may process distance-indicative information, or other wireless signal characteristic information, in order to triangulate the location of the user device during the local wireless broadcast will be understood by one skilled in the art.

In at least some embodiments, the message propagated from the GFS to the user device does not include information to be broadcast by the user device, the user device broadcasts information (e.g., a particular type of message or message portion, a particular value generated or otherwise determined by the user device, or the like, as well as various combinations thereof) using the local wireless broadcast, the witness device receives the local wireless broadcast of the user device, the witness device determines wireless signal characteristic information associated with the local wireless broadcast by the user device (e.g., signal strength information or the like), the witness device provides the wireless signal characteristic information to the GFS as (part of) the location verification information, and the GFS determines whether the location of the user device is verified based on processing of the location verification information. The various ways in which GFS may process distance-indicative information, or other wireless signal characteristic information, in order to triangulate the location of the user device during the local wireless broadcast will be understood by one skilled in the art.

It will be appreciated that various combinations of the embodiments discussed above for steps 225-245 of method 200 may be used together to support witness-based verification of the location of the user device before granting the user device access to the GFS.

At step 250, the GFS propagates a GFS access response message to the user device. The GFS access response message provides an indication as to whether or not the user device is authorized to access the GFS. If the user device is authorized to access the GFS, the access response message may include authentication information for use by the user device to access or use the GFS, authentication information for use by the user device to access or use an object controllable via the GFS, or the like. If the user device is not authorized to access the GFS, the access response message may include any suitable information (e.g., a reason that access is denied or any other suitable information).

It will be appreciated that, although omitted from FIG. 2 for purposes of clarity, where the GFS is associated with an object, method 200 also may include interaction by the user device with the object. This interaction may include interaction with the object prior to propagation of the request to access the GFS (e.g., such as where the user device detects the presence of the object and makes the user of the user device aware of the presence of the object and the possibility of access and controlling the object using the GFS associated with the object). This interaction may include interaction with the object after access to the GFS is granted (e.g., for access to and control of the object via the GFS). If the user device is authorized to access the GFS, the access response message may include an authentication token which may be provided by the user device to the object in order to enable the user device to access the object.

As discussed herein, various embodiments of method 200 of FIG. 2 may protect against various types of malicious attempts to access the GFS. For example, if the user device was not located within wireless range of the witness device (e.g., at a different location, or at least outside of the spatial region of the GFS), the witness device would not receive the local wireless broadcast from the user device and, thus, the user device would not be granted authorization to access the GFS. For example, if the user device is able to gain access to the location in which the spatial region for the GFS is defined but is not authenticated as being allowed to access the GFS (e.g., in steps 210 and 215), the user device will not receive the message from the GFS (e.g., including the unique identifier) and, thus, even where the user device maliciously attempts to broadcast a spoofed identifier, it is expected to be highly unlikely that the spoofed identifier broadcast by the user device will match the identifier expected by the GFS (e.g., as determined by the witness device or the GFS) and, therefore, quite likely that the user device would properly be denied access to the GFS. It will be appreciated that the embodiment of method 200, as well as various embodiments implemented as variations thereof, may prevent various other types of malicious attempts to access the GFS.

It will be appreciated that, although method 200 of FIG. 2 is primarily depicted and described with respect to an embodiment in which a two-stage authentication of the user device is performed before the user device is granted access to the GFS (namely, a first stage in which the identity of the user device is verified using steps 210 and 215, and a second stage in which the location of the user device is verified using steps 225-245), in at least some embodiments the first stage of authentication (namely, in which the identity of the user device is verified using steps 210 and 215) may be omitted. In such embodiments, steps 210 and 215 of method 200 may be omitted from method 200.

It will be appreciated that, although method 200 of FIG. 2 is primarily depicted and described with respect to an embodiment in which a single witness device is used to define the spatial region of the GFS and, thus, to verify the presence of user device within the spatial region of the GFS, any other suitable number of witness devices may be used to define the spatial region of the GFS and, thus, to verify the presence of user device within the spatial region of the GFS. As described above, the spatial region of the GFS may be defined such that the user device is required to be within wireless range of a threshold number of the witness devices, such that the user device is required to be within a particular distance or distances from one or more of the witness devices, such that the user device is required to be within a spatial region defined to have a particular shape, or the like). In at least some embodiments, method 200 will be understood to include interaction between the GFS and at least some of the multiple witness devices. For example, within the context of certain embodiments of method 200 of FIG. 2, each of the witness devices may receive the local wireless broadcast of the user device send associated location verification messages to the GFS. For example, within the context of certain embodiments of method 200 of FIG. 2, the GFS may propagate messages to each of the witness devices and, similarly, each of the witness devices may send associated location verification messages to the GFS. In at least some such embodiments, given the distributed nature of verification of the location of the user device (e.g., distributed in terms of requiring verification of the location of the user device by multiple witness devices), the witness devices may provide location verification messages to the GFS and the GFS may determine whether the location of the user device is verified as being at a location that is within the spatial region for the GFS. Here, for example, the location verification messages may include unique identifiers received by the witness devices from the user device (e.g., for comparison by the GFS with the unique identifier propagated to the user device), indications of results of unique identifier comparisons performed by the witness devices (e.g., such that the GFS may analyze the results of the unique identifier comparisons performed by the witness devices in order to determine whether the user device is at a location that is within the spatial region for the GFS), distance-indicative or position-indicative information from the witness devices based on the local wireless broadcast by the user device, or the like, as well as various combinations thereof. For example, where the spatial region for the GFS has five witness devices associated therewith and the spatial region is defined such that the user device only needs to be within local wireless range of at least two of the five witness devices, the GFS may process location verification information received from two or more of the witness devices in order to determine whether or not the user device satisfies the requirement of being within local wireless range of at least two of the five witness devices. For example, where the spatial region for the GFS is a triangular region defined by three witness devices, the GFS may process signal strength measurements received as part of the location verification information from the three witness devices in order to triangulate the location of the user device during the local wireless broadcast and, thus, determine whether or not the user device was located within the triangular spatial region for the GFS. For example, where the spatial region for the GFS is a quadrilateral region defined by four witness devices, the GFS may process signal strength measurements received as part of the location verification information from the four witness devices in order to triangulate the location of the user device during the local wireless broadcast and, thus, determine whether or not the user device was located within the quadrilateral spatial region for the GFS. It will be appreciated that the foregoing examples are merely a few of the various ways in which the GFS may process location verification information from multiple witness devices in order to determine whether to grant or deny the user device access to the GFS.

It will be appreciated that, although primarily depicted and described herein with respect to embodiments in which access by the user device to the GFS is limited to a single spatial region at a single location, access by the user device to the GFS may be controlled in a manner for enabling the user device to access the GFS within multiple spatial regions which may be defined at one or more locations.

It will be appreciated that, although primarily depicted and described with respect to embodiments in which the user device that is requesting access to the GFS must be physically located within the spatial region defined for the GFS (as illustrated in FIGS. 1 and 2), situations may arise in which a user that is remote from the location at which the spatial region for the GFS is defined may want or need to access the GFS. Here, while the user device of the user is not physically located within the spatial region defined for the GFS, this attempt by the user to access the GFS may still represent a valid access scenario that is to be supported. In this situation, restriction of the GFS as depicted and described with respect to FIGS. 1 and 2 may be too restrictive. Accordingly, in at least some embodiments, a user device that is requesting access to the GFS may still be granted access to the GFS even where the user device is not physically located within the spatial region defined for the GFS, as long as the GFS is able to verify that a user device of a trusted location delegate is physically located within the spatial region defined for the GFS. In at least some embodiments, a remote user device associated with the GFS may request access to the GFS from a location that is remote from the spatial region defined for the GFS, and a location delegate user device that is associated with the GFS may be identified as being the user device that must be present within the spatial region of the GFS in order for access to the GFS to be granted. Here, the GFS may interact with the location delegate user device and one or more witness devices associated with the GFS, as depicted and described herein with respect to embodiments of FIGS. 1 and 2 and various modifications of embodiments of FIGS. 1 and 2, to verify presence of the location delegate user device within the spatial region associated with granting of access to the GFS. It will be appreciated that the location delegate user device for the GFS may be pre-associated with the GFS, associated with the GFS dynamically (e.g., in conjunction with the request by the remote user device to access the GFS, such as where a user of the remote user device selects the location delegate user device such that the location delegate user device is provided to the GFS as part of or in conjunction with the request to access the GFS), or the like, as well as various combinations thereof. The GFS may then report, to the remote user device, the result of the determination as to whether the remote user device has been granted or denied access to the GFS. These embodiments may be better understood by way of reference to a simple example in which a husband and wife reside in a house and the husband would like to access a GFS from his work location even though the GFS has a spatial region that is defined as being within the living room of their home. In this example, the husband may request access to the GFS via his smartphone while at his work location by specifying the smartphone of his wife to be a location delegate user device for the GFS. In this example, if the wife accepts this request from the husband and the GFS successfully verifies that the smartphone of the wife is located within the living room of their home, the GFS will grant the husband remote access to the GFS. It will be appreciated that, although primarily depicted and described with respect to embodiments in which the location delegate user device is automatically associated with the GFS (e.g., either in advance or dynamically based on specification of the location delegate user device by a user of the remote user device), in at least some embodiments a user of the location delegate user device must explicitly accept that the location delegate user device may be used as a location delegate for the remote user device before the GFS attempts to verify the location of the location delegate user device in conjunction with determining authorization of the remote user device to access the GFS. It will be appreciated that, although primarily described with respect to embodiments in which a single location delegate user device is associated with the GFS, in at least some embodiments multiple location delegate user devices may be associated with the GFS (e.g., any of the multiple location delegate user devices may be used by the remote user device to obtain access to the GFS). It will be appreciated that at least some such embodiments may be considered to represent a compromise between global access and local security.

It will be appreciated that, although primarily depicted and described herein with respect to embodiments in which access to the GFS is limited to a single user device, access to the GFS may be controlled in a manner for enabling multiple user devices to access the GFS (e.g., requiring each of the multiple user devices to access the GFS from within a single spatial region defined for the GFS, defining for the multiple user devices separate spatial regions from within which the respective multiple user devices may access the GFS, defining multiple spatial regions for the GFS such that any of the multiple user devices may access the GFS from within any of the multiple spatial regions, or the like, as well as various combinations thereof).

It will be appreciated that, although primarily depicted and described with respect to embodiments in which the user device that is requesting access to the GFS is the only user device requesting access to the GFS, situations may arise in which multiple user devices request access to the GFS in a manner that produces or at least could potentially produce some conflict. This may be especially problematic where the GFS is used for short-lived interaction with objects at the location, in which actions through the GFS are likely to change the state of one or more objects associated with the GFS (e.g., changing a channel on a television, configuring the intensity of a light or lights, muting audio playback, and so forth). From these examples, it may be seen that concurrent use of a GFS by multiple users via multiple user devices can lead to conflicts which, even where unintentional, may still be problematic. For example, two users may attempt to (de)activate a home alarm system via their respective smartphones without being aware of each other taking such actions, two users may attempt to control the television via their respective smartphones without being aware of each other taking such actions, and so forth. Accordingly, in at least some embodiments, in which multiple user devices request access to the GFS, the GFS may be configured to use one or more witness devices to mediate access by the user devices to the GFS. The GFS may be configured to mediate access by the multiple user devices to the GFS by ensuring that only one of the user devices may interact with the GFS at any given time. In at least some embodiments, responsive to receiving multiple requests for the GFS from multiple user devices, the GFS may use information from one or more witness devices associated with the spatial region to determine which of the multiple user devices is closest to an object associated with the GFS, and to grant access to the GFS only to the closest user device while denying access to the GFS for any other of the multiple user devices.

It will be appreciated that, although primarily depicted and described herein with respect to embodiments in which the location is relatively small such that the local wireless broadcast by the user device may be performed using a short-range wireless communication capability such as a wireless personal area network (WPAN) capability (e.g., Bluetooth, ZigBee, wireless USB, or the like), it will be appreciated that, in at least some embodiments, the location at which the spatial region of the GFS is defined (and, similarly, the area of the spatial region defined for the GFS) may be relatively large, such that the wireless broadcast by the user device may need to be over a larger geographic range than may be accommodated by the short-range wireless communication capabilities discussed herein. Thus, in at least some embodiments, the wireless broadcast by the user device for enabling the witness device(s) to support location verification for the user device may be performed using other suitable types of wide-area wireless transmission capabilities (e.g., WiFi, cellular, or the like). Therefore, in at least some embodiments, references herein to the local wireless broadcast by the user device may be read more generally as being a wireless broadcast by the user device (which may be understood to be over a geographic area that is commensurate with the size of the area covered by the spatial region to which access to the GFS is confined).

It will be appreciated that, although primarily depicted and described herein with respect to embodiments in which the GFS performs functions for determining whether a user device requesting access to the GFS is granted or denied access to the GFS, in at least some embodiments at least a portion of the functions depicted and described herein as being performed by the GFS may be performed by one or more other services or devices on behalf of the GFS.

Figure 3:
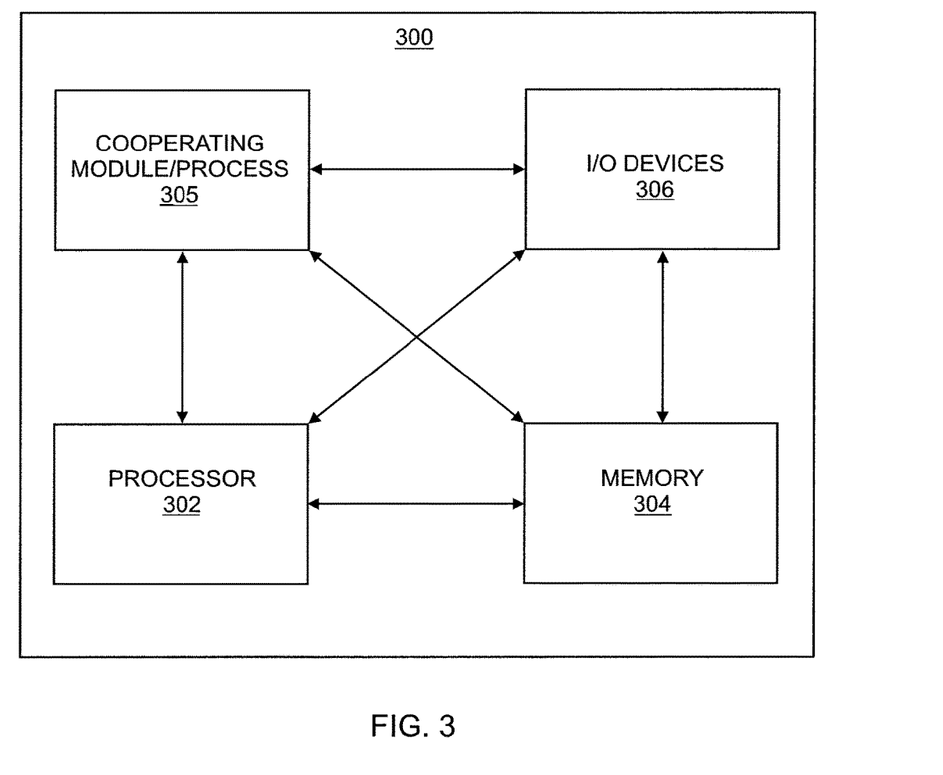
FIG. 3 depicts a high-level block diagram of a computer suitable for use in performing functions presented herein.

FIG. 3 depicts a high-level block diagram of a computer suitable for use in performing functions described herein.

The computer 300 includes a processor 302 (e.g., a central processing unit (CPU) and/or other suitable processor(s)) and a memory 304 (e.g., random access memory (RAM), read only memory (ROM), and the like).

The computer 300 also may include a cooperating module/process 305. The cooperating process 305 can be loaded into memory 304 and executed by the processor 302 to implement functions as discussed herein and, thus, cooperating process 305 (including associated data structures) can be stored on a computer readable storage medium, e.g., RAM memory, magnetic or optical drive or diskette, and the like.

The computer 300 also may include one or more input/output devices 306 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 300 depicted in FIG. 3 provides a general architecture and functionality suitable for implementing functional elements described herein and/or portions of functional elements described herein. For example, computer 300 provides a general architecture and functionality suitable for implementing one or more of user device 101, a portion of user device 101, object 111, a portion of an object 111, a witness device 115, a portion of a witness device 115, an element or portion of an element of communication network 120, an element or portion of an element hosting GFS 131, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking methods described herein may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
receive a request by a user device to access a network-hosted service, the network-hosted service having associated therewith a witness device and a spatial region to which access to the network-hosted service is confined;
propagate, toward the user device, a message configured to trigger the user device to initiate a local wireless broadcast;
receive, from the witness device via a communication path that excludes the user device, location verification information determined by the witness device based on the local wireless broadcast, wherein the location verification information received from the witness device comprises an identifier received by the witness device from the user device in the local wireless broadcast; and
determine, based on the location verification information received from the witness device, whether the user device is authorized to access the network-hosted service.

2. The apparatus of claim 1, wherein, to determine whether the user device is authorized to access the network-hosted service, the processor is configured to:
determine, based on the location verification information received from the witness device, whether the user device is located within the spatial region for the network-hosted service.

3. The apparatus of claim 1, wherein the location verification information received from the witness device comprises an indication as to whether the witness device detected the local wireless broadcast by the user device.

4. The apparatus of claim 1, wherein the location verification information received from the witness device comprises at least one of information indicative of a distance of the user device from the witness device during the local wireless broadcast or a position of the user device relative to the witness device during the local wireless broadcast.

5. The apparatus of claim 4, wherein the location verification information received from the witness device comprises at least one of a signal strength measurement or a time-of-flight measurement.

6. The apparatus of claim 4, wherein, to determine whether the user device is authorized to access the network-hosted service, the processor is configured to:
determine, based on the location verification information received from the witness device, whether the user device is located within the spatial region for the network-hosted service.

7. The apparatus of claim 1, wherein the location verification information received from the witness device comprises an indication as to whether the witness device verified the user device as being at a location that is within the spatial region for the network-hosted service.

8. The apparatus of claim 1, wherein the processor is configured to:
propagate, toward the witness device, a message indicative of the request by the user device to access the network-hosted service.

9. The apparatus of claim 1, wherein the message configured to trigger the user device to initiate the local wireless broadcast comprises the identifier, wherein the message is configured to trigger the user device to include the identifier in the local wireless broadcast.

10. The apparatus of claim 9, wherein, to determine whether the user device is authorized to access the network-hosted service, the processor is configured to:
compare the identifier propagated toward the user device in the message configured to trigger the user device to initiate the local wireless broadcast with the identifier received from the witness device in the location verification information.

11. The apparatus of claim 1, wherein the network-hosted service has multiple witness devices associated therewith, wherein the spatial region of the network-hosted service is defined based on the multiple witness devices.

12. The apparatus of claim 11, wherein the spatial region of the network-hosted service comprises at least one of:
an area defined based on being within wireless range of at least a threshold number of the multiple witness devices; or
an area within a shape defined based on the multiple witness devices.

13. The apparatus of claim 1, wherein the network-hosted service is associated with a physical object, wherein the network-hosted service is configured to support interaction with the physical object.

14. The apparatus of claim 1, wherein the witness device comprises at least one of a smart device or a sensor.

15. An apparatus, comprising:
a processor and a memory communicatively connected to the processor, the processor configured to:
receive a request by a user device to access a network-hosted service, the network-hosted service having associated therewith a witness device and a spatial region to which access to the network-hosted service is confined;
propagate, toward the user device, a message configured to trigger the user device to initiate a local wireless broadcast, wherein the message comprises an identifier and is configured to trigger the user device to include the identifier in the local wireless broadcast;
receive, from the witness device via a communication path that excludes the user device, location verification information determined by the witness device based on the local wireless broadcast, wherein the location verification information received from the witness device comprises the identifier received by the witness device from the user device in the local wireless broadcast; and
determine, based on a comparison of the identifier propagated toward the user device in the message configured to trigger the user device to initiate the local wireless broadcast with the identifier received from the witness device in the location verification information, whether the user device is authorized to access the network-hosted service.

16. An apparatus, comprising:
a processor and a memory communicatively connected to the processor, the processor configured to:
receive a request by a user device to access a network-hosted service, the network-hosted service having associated therewith a witness device and a spatial region to which access to the network-hosted service is confined;
propagate, toward the user device, a message configured to trigger the user device to initiate a local wireless broadcast, wherein the message comprises an identifier and is configured to trigger the user device to include the identifier in the local wireless broadcast;
propagate, toward the witness device, the identifier propagated toward the user device in the message configured to trigger the user device to initiate the local wireless broadcast;
receive, from the witness device via a communication path that excludes the user device, location verification information determined by the witness device based on the local wireless broadcast, wherein the location verification information received from the witness device comprises an indication as to a result of a determination by the witness device as to whether the identifier propagated toward the witness device matches the identifier received by the witness device from the user device in the local wireless broadcast; and
determine, based on the location verification information, whether the user device is authorized to access the network-hosted service.

17. An apparatus, comprising:
a processor and a memory communicatively connected to the processor, the processor configured to:
receive a request by a user device to access a network-hosted service, the network-hosted service having associated therewith a set of multiple witness devices and a spatial region to which access to the network-hosted service is confined;
propagate, toward the user device, a message configured to trigger the user device to initiate a local wireless broadcast;
receive, from one or more of the witness devices via one or more communication paths that exclude the user device, respective signal strength measures associated with receipt by the one or more of the witness devices of the local wireless broadcast by the user device; and
determine, based on the respective signal strength measures associated with the-one or more of the witness devices, whether the user device is authorized to access the network-hosted service.

18. An apparatus, comprising:
a processor and a memory communicatively connected to the processor, the processor configured to:
propagate, from the apparatus toward a network device associated with a network-hosted service, a request to access the network-hosted service, the network-hosted service having associated therewith a witness device and a spatial region to which access to the network-hosted service is confined;
receive, at the apparatus from the network device, a message configured to trigger the apparatus to initiate a local wireless broadcast, wherein the message configured to trigger the apparatus to initiate the local wireless broadcast comprises information to be included in the local wireless broadcast, wherein the information to be included in the local wireless broadcast comprises an identifier;

perform the local wireless broadcast, based on receipt of the message configured to trigger the apparatus to initiate the local wireless broadcast, using the information to be included in the local wireless broadcast; and receive, at the apparatus, an indication as to whether the apparatus is authorized to access the network-hosted service.

19. An apparatus, comprising:

a processor and a memory communicatively connected to the processor, the processor configured to:

receive, by a witness device, a local wireless broadcast from a user device requesting to access a network-hosted service, the local wireless broadcast comprising an identifier, the network-hosted service having associated therewith a spatial region to which access to the network-hosted service is confined;

determine, by the witness device based on the local wireless broadcast from the user device, location verification information indicative of a location of the user device relative to the spatial region of the network-hosted service, wherein the location verification information comprises the identifier received by the witness device from the user device in the local wireless broadcast; and propagate the location verification information from the witness device toward a network device associated with the network-hosted service via a communication path that excludes the user device.

* * * * *